April 14, 1959 M. KURSH 2,881,912

PHONOGRAPH RECORD HOLDER

Filed May 8, 1957

INVENTOR.
Maurice Kursh
BY
Jack M. Wiseman
Attorney 2,881,912

PHONOGRAPH RECORD HOLDER

Maurice Kursh, Palo Alto, Calif.

Application May 8, 1957, Serial No. 657,958

8 Claims. (Cl. 206—62)

The present invention appertains in general to containers for discs, and more particularly to a holder for a phonograph disc record.

In the storing and displaying of phonograph records, it is desirable that the phonograph records be kept free of dust particles. At the present time, however, records which are stored individually in containers that minimize the collection of dust particles are difficult to remove from the container and also troublesome to insert into the container. Furthermore, the records contained by such holders do not have the upper surfaces thereof fully exposed and, hence, are not effectively displayed to the prospective purchaser. Moreover, the record holders of today deteriorate rapidly and become soiled in appearance easily.

Accordingly, an object of the present invention is to provide a disc holder that permits the disc contained therein to be removed with facility.

Another object is to provide a more durable record holder that may be displayed effectively to prospective purchasers.

Another object of the present invention is to provide a phonograph record holder that not only forms a complete enclosure to protect a record contained therein from dust particles, but also enables the upper surface of the phonograph record to be fully visible.

Another object is to provide a phonograph record holder that protects a record contained therein from collecting dust particles and permits the record to be removed therefrom and inserted therein with ease.

Another object is to provide a phonograph record holder that is compact and wherein improved accessibility is afforded for engaging the projecting peripheral edge of a record.

Other objects will appear upon further perusal of the detailed description taken in conjunction with the accompanying drawings, in which.

Figure 1:
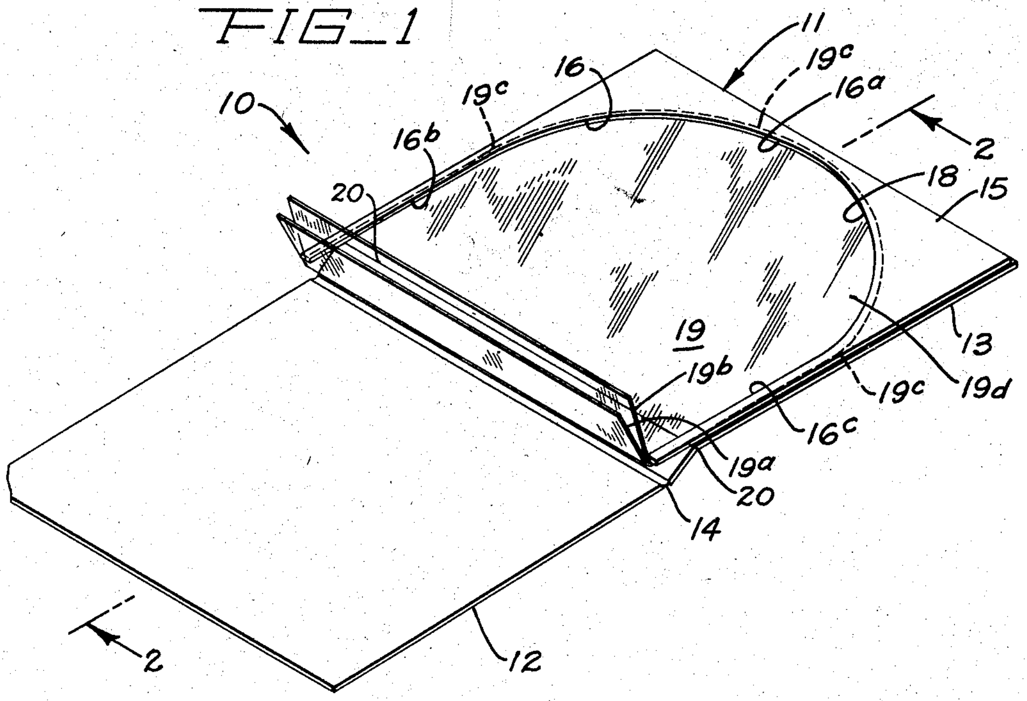
Fig. 1 is a perspective view of the phonograph record holder of the present invention with the cover thereof folded to an opened position.

In Fig. 1, the record holder 10 of the present invention is illustrated as comprising a sheath or record receiving section 11 and a cover 12. The record receiving section 11 includes a flat and rigid base member 13, which is connected to the cover 12 by a hinge 14 that extends throughout the length of the conjoined edges of the base member 13 and the cover 12, respectively. Hence, the cover 12 is opened and closed by movements similar to the opening and closing of a book.

Figure 2:
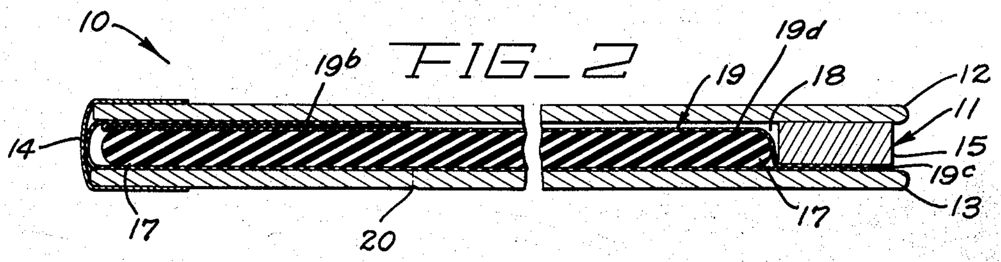
Fig. 2 is an enlarged fragmentary vertical section of the record holder taken along line 2—2 of Fig. 1 with the cover thereof folded to a closed position.

Superposed on the base member 13 in fixed relation therewith is a flat and rigid body or spacer member 15 which has its outer edges substantially coextensive with the outer edges of the base member 13. The spacer member 15 includes an inner wall 16 having a semi-cylindrical portion **16*a*, which has a configuration conforming to the contour of the forward peripheral edge of a disc, such as phonograph record 17 (Fig. 2). In addition, the spacer member 15 comprises two transversely spaced, parallel side wall portions 16*b* and 16*c*, which are tangent to the semi-cylindrical wall portion 16*a*. The free ends of the side wall portions 16*b* and 16*c* extend perpendicular to and terminate at the junction where the hinge 14 meets the base member 13. Thus, a recess 18 is formed by the spacer member 15 in conjunction with the base member 13 for receiving the record 17, and the projecting ends of the spaced side wall portions 16*b* and 16*c* adjacent the hinge 14 define a side opening or open end for the recess 18 by which the record 17 may be moved in a plane passing through the spacer member 15 for entry into and exit from the recess 18. The recess 18 is of slightly greater depth than the thickness of the record 17 to enable the cover 12 to rest flatly over the record 17 and is also of adequate area to contain completely the record 17. It is within the contemplation of this invention that the base member 13 and the spacer member 15 may be integrally formed. From the foregoing, it is to be observed that the body member 15 is fixed to the base member 13 on three sides by suitable adhesive material with the side walls 16*b* and 16*c* defining the side opening for the recess 18**.

Interposed between the base member 13 and the spacer member 15 is a transparent envelope 19, which includes three marginal edges **19*c* fixedly secured between the base member 13 and the spacer member 15 by suitable adhesive material. In addition, the envelope 19 includes a body portion 19*d* disposed within the recess 18 in overlying relation to the entire surface of the base member 13 exposed by the recess 18. In the preferred embodiment, the envelope 19 is made of a suitable transparent plastic material, such as vinyl. The envelope 19 has two free end flap portions 19*a* and 19*b*, which are foldable about edges disposed parallel with and adjacent to the hinge 14 and define an opening therebetween for receiving the record 17. Therefore, a record inserted within the envelope 19 is completely enclosed by the folding of flap portions 19*a* and 19*b*** to minimize the collection of dust particles on the record.

Figures 3, 4:
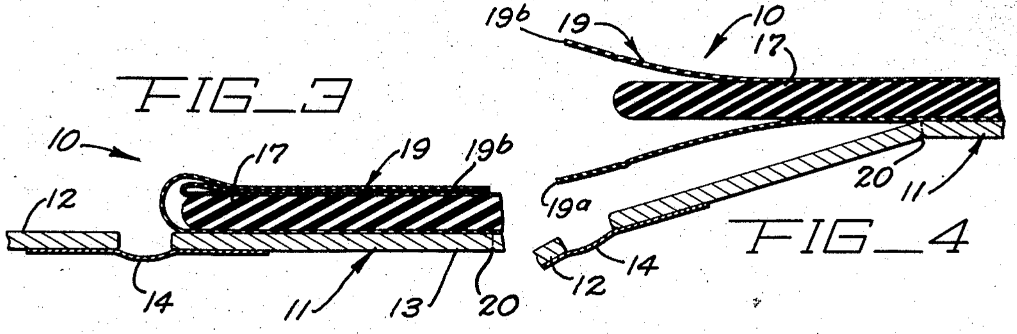
Fig. 3 is an enlarged fragmentary side elevation of the record holder illustrating the cover in an open position and the base member of the record receiving section in even contact with the body member of the record receiving section.
Fig. 4 is an enlarged fragmentary side elevation illustrating the cover in an open position and the base member of the record receiving section in a folded position extended away from the body member of the record receiving section.

In order to facilitate the removal of a record from the record receiving section 11 while the cover 12 is in an opened position, a fold line 20 in the form of scoring is provided on the base member 13. It is within the contemplation of the present invention that the fold line may be also formed by perforations, indentations, pressings or a hinge. The fold line 20 is disposed in spaced parallel relation with the hinge 14 at a suitable distance therefrom to enable the portion of the base member 13 between the hinge 14 and the fold line 20 to be flexed away from the spacer member 15. When the portion of the base member 13 adjacent the hinge 14 is flexed, it provides a more accessible area for gripping the projected end portion of a record inserted in the envelope 19 and the recess 18. As is clearly shown in Fig. 3, the cover 12 is extended outwardly away from the base member 13 and the portion of the base member 13 adjacent the hinge 14 is in snug abutting relation with the spacer member 15. In Fig. 4, the cover 12 is shown in an outwardly extended position and the portion of the base member 13 adjacent the hinge 14 is flexed about the scoring 20 away from the spacer member 15, thereby providing the more accessible area for gripping the projected peripheral edge of the record for permitting easy removal of the record from the recess 18 and the envelope 19.

In the use of the record holder 10, the cover 12 is unfolded about the hinge 14 to an opened position and the flap ends 19*a* and 19*b* of the envelope 19 are extended outward about their folds to rest upon the cover 12. The record 17 is inserted in the open end of the envelope 19 defined by the flap ends 19*a* and 19*b* for movement in a plane passing through the spacer member 15. In the continued movement of the record 17 in the plane passing through the spacer member 15, the record 17 enters the recess 18 in guided relation between the side wall portions 16*b* and 16*c* of the spacer member 15 and in sliding relation with the base member 13. The semi-cylindrical wall portion 16*a* provides an abutment wall to arrest the forward movement of the record 17 during insertion within the recess 18. The record 17 is inserted within the recess 18 and the flap ends 19*a* and 19*b* of envelope 19 are folded about their edges toward the spacer member 15, thereby enclosing the record 17 within the envelope 19 to minimize the collection of dust particles. Thereupon, the cover 12 is folded about the hinge 14 to a closed position in abutting relation with the spacer member 15. In the event the flap ends 19*a* and 19*b* of envelope 19 are not closed manually, the closing of the cover 12 will automatically fold them into a closed position. It is to be noted that the cover 12 is substantially the same size as the base member 13 and when the cover 12 is in a closed position, its outer edges are coextensive with the outer edges of the base member 13.

To remove the record 17 from the record holder 10, the cover 12 is unfolded about the hinge 14 outward from the spacer member 15 and projects in a fully extended position. Similarly, the flap ends 19*a* and 19*b* of envelope 19 are extended outward. Thereupon, the portion of the base member 13 adjacent the hinge 14 is flexed about the fold line 20 away from the spacer member 15 thereby increasing the accessible area for gripping the protruding peripheral edge of the record 17. At this point the peripheral edge of the record is gripped and the record is moved outwardly in a plane passing through the spacer member 15 and in guided relation between the side wall portions 16*b* and 16*c* for removal from the recess 18 and the envelope 19.

It is to be observed that the record 17 is contained in the envelope 19 under dust-proof conditions and, yet, the upper surface thereof is fully visible. This is made possible by the envelope 19 and the construction of the spacer member 15 in forming a recess with the base member 13. In practice, the envelope 19 is made of vinyl material, since the vinyl is soft and durable. By virtue of the softness of the vinyl, scratching of the record is minimized.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. In a phonograph disc record holder, a base member for supporting a record, a cover hingedly attached to said base member for movement about conjoined edges thereof, a spacer member superposed on said base member in fixed relation and forming therewith a recess for receiving a record, and an envelope interposed between said spacer member and said base member in overlapping relation to said recess and including an open end adjacent said conjoined edges, said base member including a fold line disposed adjacent said conjoined edges for permitting the flexing of a portion of said base member adjacent said conjoined edges for angular displacement relative to said spacer member to facilitate the removal of a record from said envelope and said recess.

2. In a phonograph disc record holder, a base member for supporting a disc record, a body member superposed on said base member to form a recess therewith for receiving a record, said body member including an inner abutment wall having a contour conforming to the contour of a portion of the peripheral edge of a record to arrest the movement of a record inserted in said recess and inner side walls disposed tangentially to said abutment wall to guide the movement of a record into said recess, and a sheet disposed between said base member and said body member in overlapping relation to said recess to protectively cover a record received by said recess.

3. In a phonograph disc record hold, a base member for supporting a disc record, a spacer member superposed on said base member to form a recess therewith for receiving a record, said spacer member including an inner abutment wall having a contour conforming to the contour of a portion of the peripheral edge of a record to arrest the movement of a record inserted in said recess and inner side walls disposed tangentially to said abutment wall to guide the movement of a record into said recess, and an envelope disposed between said base member and said spacer member in overlapping relation to said recess to protectively cover a record received by said recess.

4. A phonograph disc record holder comprising a rigid base member, a rigid cover hingedly attached to said base member for movement about conjoined edges thereof, a spacer member superposed on said base member to form a recess therewith for receiving a record, said spacer member including an inner abutment wall having a contour conforming to the contour of a portion of the peripheral edge of a record to arrest the forward movement of a record movable in a plane passing through said spacer member for insertion in said recess and spaced inner walls disposed tangentially from said abutment wall and extending toward said conjoined edges to guide a record movable in said plane for insertion in said recess, and an envelope fixed between said base member and said spacer member in overlapping relation to said recess to protectively cover a record received by said recess.

5. A phonograph disc record holder comprising a rigid base member, a rigid cover hingedly attached to said base member for movement about conjoined edges thereof, a spacer member superposed on said base member to form a recess therewith for receiving a record, said spacer member including an inner semi-cylindrical abutment wall having a contour conforming to the contour of the peripheral edge of a record to arrest the forward movement of a record movable in a plane passing through said spacer member for insertion in the recess and spaced inner walls disposed tangentially from said abutment wall and extending toward said conjoined edges to guide the movement of a record movable in said plane for insertion in said recess, and a transparent envelope fixed between said base member and said spacer member in overlapping relation to said recess to protectively cover a record received by said recess and having an open end disposed adjacent said conjoined edges, said base member including a fold line disposed in spaced parallel relation with said conjoined edges for permitting the folding of a portion of said base member between said conjoined edges and said fold line to provide an accessible area for gripping the peripheral edge of a record.

6. A disc holder comprising a flat rigid base member, a flat rigid spacer member superposed on said base member for forming therewith a disc-receiving recess, said recess having an access opening adjacent one edge of said base member for enabling a disc to be inserted into and removed from said recess, said spacer member including an inner semi-cylindrical abutment wall positioned to arrest the forward movement of a disc movable in a plane passing through said access opening and said spacer member for insertion into said recess, said spacer member also including spaced inner walls disposed tangentially to said inner abutment wall and extending adjacent to said one edge of said base member to guide the movement of a disc movable in said plane for insertion into said recess, and a flat rigid cover having one edge thereof hingedly attached to said one edge of said base member for pivotal movement about a first axis defined by the conjoined edges of said base member and said cover, said base member including a score line spaced in parallel relation with said one edge of said base member for defining a second axis of pivotal movement adjacent the conjoined edges of said base member and said cover, whereby said cover is pivoted about said first axis from a position overlying said spacer member to an open position and continued movement of said cover urges a portion of said base member between said one edge thereof and said score line to be pivoted about said second axis for angular displacement relative to said spacer member for facilitating the removal of a disc received by said recess.

7. A phonograph record holder comprising a flat rigid base member, a flat rigid spacer member superposed on said base member for forming therewith a record-receiving recess, said recess having an access opening adjacent one edge of said base member for enabling a record to be inserted into and removed from said recess, said spacer member including a semi-cylindrical inner abutment wall positioned to arrest the forward movement of a record movable in a plane passing through said access opening and said spacer member for insertion into said recess, said spacer member also including spaced inner walls disposed tangentially to said inner abutment wall and extending adjacent to said one edge of said base member to guide the movement of a record in said plane for insertion into said recess, an end opening envelope fixed between said base member and said spacer member in overlapping relation to said recess to protectively cover a record received by said recess, and a flat rigid cover having one edge thereof hingedly attached to said one edge of said base member for pivotal movement about a first axis defined by the conjoined edges of said base member and said cover, said base member including a score line spaced in parallel relation with said one edge thereof for defining a second axis of pivotal movement adjacent the conjoined edges of said base member and said cover, whereby said cover is pivoted about said first axis from a position overlying said spacer member to an open position and continued movement of said cover urges a portion of said base member between said one edge thereof and said score line to be pivoted about said second axis for angular displacement relative to said spacer member for facilitating the removal of a record received by said recess.

8. An article holder comprising a flat rigid base member, a flat rigid spacer member superposed on said base member for forming therewith an article-receiving recess, said recess having an access opening adjacent one edge of said base member for enabling an article to be inserted into and removed from said recess, an envelope interposed between said spacer member and said base member in overlapping relation to said recess and including an open end adjacent said access opening for protecting an article received by said recess, and a flat rigid cover having one edge thereof hingedly attached to said one edge of said base member for pivotal movement about a first axis defined by the conjoined edges of said base member and said cover, said base member including a score line spaced in parallel relation with said one edge of said base member for defining a second axis of pivotal movement adjacent the conjoined edges of said base member and said cover, whereby said cover is pivoted about said first axis from a position overlying said spacer member to an open position and continued movement of said cover urges a portion of said base member between said one edge thereof and said score line to be pivoted about said second axis for angular displacement relative to said spacer member for facilitating the removal of an article received by said recess.

References Cited in the file of this patent

UNITED STATES PATENTS

| | | |
|---|---|---|
| 484,653 | Clerk | Oct. 18, 1892 |
| 559,219 | Sadlier | Apr. 28, 1896 |
| 1,492,101 | Mordecai | Apr. 29, 1924 |
| 1,970,394 | Salinger | Aug. 14, 1934 |
| 2,792,111 | Ringler et al. | May 14, 1957 |

FOREIGN PATENTS

| | | |
|---|---|---|
| 110,805 | Sweden | Apr. 5, 1944 |
| 437,163 | Great Britain | Oct. 24, 1935 |